United States Patent
Zeen et al.

(10) Patent No.: US 11,213,038 B2
(45) Date of Patent: Jan. 4, 2022

(54) DEVICE, METHOD AND ASSEMBLY FOR SEPARATING WING TIPS FROM POULTRY CARCASSES

(71) Applicant: LINCO FOOD SYSTEMS A/S, Trige (DK)

(72) Inventors: Jacobus Zeen, GC Doesburg (NL); Tim Andries Veen, BL Nijmegen (NL); Rudi Theodorus Maria Polman, EG Doesburg (NL)

(73) Assignee: Linco Food Systems A/S, Trige (DK)

( * ) Notice: Subject to any disclaimer, the term of this patent is extended or adjusted under 35 U.S.C. 154(b) by 0 days.

(21) Appl. No.: 16/972,193

(22) PCT Filed: Jun. 20, 2018

(86) PCT No.: PCT/EP2018/066489
§ 371 (c)(1),
(2) Date: Dec. 4, 2020

(87) PCT Pub. No.: WO2019/242857
PCT Pub. Date: Dec. 26, 2019

(65) Prior Publication Data
US 2021/0251247 A1    Aug. 19, 2021

(51) Int. Cl.
*A22C 21/00*    (2006.01)

(52) U.S. Cl.
CPC ...... *A22C 21/0023* (2013.01); *A22C 21/0053* (2013.01)

(58) Field of Classification Search
CPC ............ A22C 21/0023; A22C 21/0053; A22C 21/0069; A22C 21/0084
(Continued)

(56) References Cited

U.S. PATENT DOCUMENTS

| 5,188,560 A | 2/1993 | Hazenbroek |
| 5,618,230 A | 4/1997 | Bargele et al. |

(Continued)

FOREIGN PATENT DOCUMENTS

| CN | 106163288 A | 11/2016 |
| EP | 0431607 A1 | 6/1991 |

(Continued)

OTHER PUBLICATIONS

International Search Report dated Mar. 4, 2019; International Application No. PCT/EP2018/066489.

*Primary Examiner* — Richard T Price, Jr.
(74) *Attorney, Agent, or Firm* — Dinsmore & Shohl LLP

(57) ABSTRACT

An apparatus for separating wing tips from poultry carcasses includes a suspended conveyor device and a support guide for guiding the neck and shoulder region. The guide extends in the transport direction and is arranged below the carcass, and has at least one support surface to support the neck and shoulder region. A lower arm guide is configured for guiding the poultry lower arm and wing tip and is arranged at the side of the support guide. A first hold-down guide holds down the poultry upper arm under pretension and is arranged stationarily. A second hold-down guide is arranged downstream of the first hold-down guide and has at least two guiding elements for holding down the upper arm. The guiding elements are movable in deflection against a return force. A separating device is configured for separating the wing tip and is arranged in the region of the second hold-down guide.

22 Claims, 12 Drawing Sheets

(58) Field of Classification Search
USPC .............. 452/149, 150, 166, 167, 169, 170
See application file for complete search history.

(56) References Cited

U.S. PATENT DOCUMENTS

| | | | |
|---|---|---|---|
| 5,733,184 A * | 3/1998 | Curry ................... | A22C 17/04 452/111 |
| 6,277,020 B1 * | 8/2001 | Stephens ............ | A22C 21/0023 452/135 |
| 7,335,095 B2 * | 2/2008 | Sekiguchi .......... | A22C 21/0023 452/169 |
| 7,341,505 B1 * | 3/2008 | Gasbarro ........... | A22C 21/0023 452/169 |
| 8,419,511 B1 * | 4/2013 | Gasbarro ........... | A22C 21/0084 452/169 |
| 8,517,805 B1 | 8/2013 | Ray et al. | |
| 8,727,839 B2 * | 5/2014 | Hazenbroek ....... | A22C 21/0023 452/169 |
| 2007/0072530 A1 | 3/2007 | Sekiguchi et al. | |
| 2008/0171506 A1 | 7/2008 | Nieuwelaar et al. | |

FOREIGN PATENT DOCUMENTS

| | | |
|---|---|---|
| EP | 0709031 A1 | 5/1996 |
| EP | 3205213 A1 | 8/2017 |
| JP | 2803031 B2 | 9/1998 |
| JP | 2010193719 A | 9/2010 |
| WO | 1992/07470 A1 | 5/1992 |
| WO | 2005094596 A1 | 10/2005 |
| WO | 2014073957 A1 | 5/2014 |

* cited by examiner

DEVICE, METHOD AND ASSEMBLY FOR SEPARATING WING TIPS FROM POULTRY CARCASSES

CROSS REFERENCE TO RELATED APPLICATIONS

This application is the U.S. National Stage of PCT/EP2018/066489 filed Jun. 20, 2018, the entire content is incorporated herein by reference in its entirety.

FIELD OF THE INVENTION

The present invention concerns an apparatus and a method for separating wing tips from poultry carcasses. The invention furthermore concerns an arrangement and a method for separating wing tips from poultry carcasses on both sides.

BACKGROUND OF THE INVENTION

Such apparatuses and methods for separating wing parts are known for example from document WO 92/07470 A1. The wing parts are brought into a cutting position by means of wing holders which hold the poultry wing with its constituent parts—the poultry upper arm, poultry lower arm and wing tip—and separate these on both sides simultaneously by means of rotating knives.

A further apparatus and a method for cutting poultry are disclosed in document EP 3 205 213 A1, in which wings or wing parts are separated only on one side of the poultry carcass.

The known apparatuses and methods have the disadvantage that because of the variations in size and anatomy of poultry carcasses, it is not always possible to guarantee a precise cutting path and observation of a predefined separating position, or the apparatus necessary for this entails a high constructional cost.

SUMMARY OF THE INVENTION

It is therefore the object of the present invention to propose an apparatus with as simple a structure as possible, by means of which the process of separating wing tips can be achieved with great accuracy and largely independently of the size of the poultry carcass.

This object is achieved by the apparatus cited hereinbefore, in that the apparatus according to the invention has a suspended conveyor device which is configured to convey poultry carcasses suspended from the legs along a conveyor line in the transport direction; a support guide which is configured for guiding the neck and shoulder region, extends in the transport direction and is arranged below the poultry carcass, and has at least one support surface configured to support the neck and shoulder region of the poultry carcass; a lower arm guide which is configured for guiding the poultry lower arm and wing tip of the poultry carcass and is arranged at the side of the support guide; a first hold-down guide which is configured for holding down the poultry upper arm under pretension and is arranged stationarily; a second hold-down guide which is arranged downstream of the first hold-down guide in the transport direction and has at least two guiding elements configured for holding down the poultry upper arm, wherein the guiding elements are arranged so as to be movable in deflection against a return force; and a separating device which is configured for separating the wing tip and is arranged along the conveyor line in the region of the second hold-down guide.

This offers the advantage that the poultry arm is optimally pre-positioned and oriented for performance of a separating cut by means of the separating device, so that a highly precise separating cut is achieved. Due to the guiding elements which are movable in deflection, an optimal orientation and positioning effect is always achieved independently of the anatomy and size of the poultry carcass.

In other words, the guiding elements are configured so as to be self-adjusting. These adapt to the respective anatomical features of the poultry carcass under the effect of a return force, and thus always guarantee said orientation of the poultry arm in order to ensure an optimum cutting result.

A suitable embodiment of the invention is characterised in that one of the guiding elements is formed as a pre-guiding element for holding down the poultry upper arm at the inlet to the separating device. Thus, the necessary pre-orientation and pre-positioning of the poultry arm can be achieved in a particularly simple structural fashion. At the inlet to the separating device, a rough pre-orientation of the poultry arm is sufficient, since the poultry arm is not yet in the operating region of the separating device. The structural simplicity of the pre-guiding element has an advantageous effect on a low degree of complexity of the apparatus according to the invention, and an associated increased reliability with simultaneously low equipment costs.

A preferred refinement of the invention is distinguished in that one of the guiding elements is configured as a separating guide element for holding down the poultry upper arm in an operating region of the separating device in order to separate the wing tip from the poultry lower arm. The separating guide element achieves an extensive and precise orientation and positioning of the poultry arm immediately before or during the separating cut by means of the separating device. A further advantage is that the poultry arm is guided accurately and precisely by means of the separating guide element during separation of the wing tips, but at the same time a succeeding poultry carcass is pre-positioned and pre-oriented by means of the pre-guiding element. In this way, it is possible to minimise the distance between two poultry carcasses conveyed by means of the suspended conveyor device, and thus increase the overall output of the apparatus and method. The pre-orientation of a succeeding poultry carcass by means of the pre-guiding element according to the invention has no negative effect on the guidance and orientation of the poultry carcass already in the separating device, so that separation of the wing tips takes place with the desired precision.

According to a further preferred refinement of the invention, the first hold-down guide, the lower arm guide, the pre-guiding element and the separating guide element each have an at least substantially L-shaped profile with an upper arm guiding surface for exerting a guide force on the poultry upper arm in the direction of gravity, and a lower arm guiding surface for exerting a guide force on the poultry lower arm perpendicularly to the direction of gravity. In this way, all parts of the poultry arm are guided in a defined fashion, and the same orientation and pre-positioning is always achieved for performance of a precise separating cut by means of the separating device. Also, the friction, which necessarily occurs on guidance of the poultry arm, between the parts of the poultry arm and said guides, ensures that the entire poultry arm trails slightly behind the remaining poultry carcass, so that a desired oblique orientation of the poultry arm is achieved independently of the length of the poultry arm, which has a particularly advantageous effect for increasing the cutting precision on performance of the separating cut by means of the separating device.

A further suitable embodiment of the invention is characterised in that the pre-guiding element is arranged on a pivot arm, wherein the pivot arm is configured so as to be pivotable about a stationary pivot axis running in a first end region above the first hold-down guide.

Advantageously, this always ensures that the poultry upper arm is guided securely, independently of the anatomical features of the poultry carcass. The deflection of the pivot arm is set automatically depending on the thickness of the poultry upper arm, so that a reliable guidance is always guaranteed independently of the actual poultry anatomy.

A preferred refinement of the invention is distinguished in that the pivot arm with the pre-guiding element is arranged so as to be pivotable about the stationary pivot axis, forming a first pivot joint, such that in a waiting position, said axis is oriented tilted towards the support guide by a tilt angle α. In this way, in the waiting position, the pre-guiding element forms an obliquely oriented infeed surface. Depending on the diameter of the poultry upper arm, this comes into contact with the pre-guiding element earlier or later, and deflects the pre-guiding element with the pivot arm accordingly while the transport process continues. Thus an optimal pre-orientation and pre-positioning of the poultry arm is always achieved.

According to a further preferred embodiment, to limit the pivot travel of the first pivot joint, on the end face pointing towards the first hold-down guide, the pre-guiding element has a first counter surface which is configured to limit the tilt angle α to a maximum tilt, and in the waiting position comes into contact with a first end face surface of the first hold-down guide with at least partial positive locking. Thus, the degree of oblique positioning can be configured so as to be predefinable. By using different pre-guiding elements with correspondingly different counter-surface geometry, the maximum tilt can be adapted optimally to the respective production process.

A suitable embodiment of the invention is characterised in that on the inlet side, the separating guide element is arranged on a free end of the pivot arm so as to be pivotable about a pivotable pivot axis, forming a second pivot joint. In this way, on the one hand a quasi-seamless transition of the guidance from the pre-guiding element to the separating guide element is achieved. Due to the mechanical coupling described, the respective active guide surfaces of the pre-guiding element and the separating guide element are situated at the same height level at the transition point, so that the guiding force acts without interruption on the poultry upper arm. On the other hand, the separating guide element is to a certain degree decoupled from the pre-guiding element by means of the second pivot joint.

According to an advantageous embodiment of the invention, the separating guide element is arranged on the free end of the pivot arm such that, in the waiting position, the separating guide element is oriented at least substantially parallel to the support surface of the support guide.

A preferred refinement of the invention is distinguished in that, on the end face pointing towards the separating guide element, the pre-guiding element has a second end face surface which is configured, on reaching a predefined pivot angle β, to come into contact with an inlet-side second counter surface of the separating guide element with at least partial positive locking, such that the separating guide element together with the pre-guiding element forms a common lever arm which is pivotable about the first pivot joint, blocking the second pivot joint. The pre-guiding element and the separating guide element in this state form a single common lever arm which pivots about the first stationary pivot axis. Because of the total leverage, a significantly increased contact force is applied to the poultry upper arm and thus a precise positioning of the poultry arm is ensured during the separating cut by means of the separating device.

The object is also achieved by the arrangement cited hereinbefore, wherein the arrangement according to the invention comprises two apparatuses for separating wing tips from poultry carcasses with the features described above, wherein the apparatuses are arranged sequentially behind one another, and one apparatus is configured to separate the right and the respective other apparatus is configured to separate the left wing tip. The associated advantages have already been explained in detail in connection with the apparatus according to the invention.

Furthermore, the object is achieved by the method cited hereinbefore which comprises the following steps: transport of poultry carcasses suspended from the legs along a conveyor line in the transport direction by means of a suspended conveyor device; guiding the neck and shoulder region by means of a support guide which extends in the transport direction and is arranged below the poultry carcass, and has at least one support surface configured to support the neck and shoulder region of the poultry carcass; guiding the poultry lower arm and wing tip of the poultry carcass by means of a lower arm guide which is arranged at the side of the support guide; holding down the poultry upper arm under pretension by means of a first hold-down guide which is arranged stationarily; holding down the poultry upper arm with a second hold-down guide which is arranged downstream of the first hold-down guide in the transport direction and has at least two guiding elements arranged so as to be movable in deflection against a return force; and separating the wing tips by means of a separating device which is arranged along the conveyor line in the region of the second hold-down guide.

To avoid repetition, in connection with the method according to the invention, reference is made to the benefits described above in detail in connection with the apparatus according to the invention. This applies similarly for the method according to the invention described below.

A suitable embodiment of the invention is characterised by pre-orientation of the poultry upper arm at the inlet to the separating device by means of one of the guiding elements which is configured as a pre-guiding element for holding down the poultry upper arm.

According to a further preferred embodiment of the invention, in an operating region of the separating device for separating the wing tip from the poultry lower arm, the poultry upper arm is held down by means of one of the guiding elements which is configured as a separating guide element.

A preferred refinement of the invention is distinguished by the exerting of a guide force on the poultry upper arm in the direction of gravity, and a guide force on the poultry lower arm perpendicularly to the direction of gravity, and in that the lower arm guide, the pre-guiding element and the separating guide element each have an at least substantially L-shaped profile with an upper arm guiding surface oriented at least substantially horizontally and a lower arm guiding surface oriented at least substantially perpendicularly thereto.

An advantageous refinement of the invention is characterised by holding down the poultry upper arm by means of the pre-guiding element by pivoting deflection of the pre-guiding element which is arranged on a pivot arm, wherein the pivot arm pivots about a stationary pivot axis running in a first end region above the first hold-down guide.

According to a preferred refinement, the pivot arm with the pre-guiding element is pivoted about the stationary pivot axis, forming a first pivot joint, such that, in a waiting position, said axis is oriented tilted towards the support guide by a tilt angle α.

Preferably, the pivot travel of the first pivot joint is limited in that, on the end face pointing towards the first hold-down guide, the pre-guiding element has a first counter surface which is configured for limiting the tilt angle α to a maximum tilt and, in the waiting position, comes into contact with a first end face surface of the first hold-down guide with the least partial positive locking.

A preferred refinement of the invention is distinguished by the pivoting of the separating guide element about a pivotable pivot axis, forming a second pivot joint, in that on the inlet side, the separating guide element is pivotably arranged at a free end of the pivot arm.

Furthermore, preferably, in the waiting position, the separating guide element is oriented at least substantially parallel to the support surface of the support guide.

A further suitable embodiment of the invention is characterised by blocking of the second pivot joint on reaching the predefined pivot angle β, such that the separating guide element together with the pre-guiding element forms a common lever arm which is pivotable about the first pivot joint.

The object is also achieved by the method cited initially for separating the wing tips from poultry carcasses on both sides, in that the method described above for separating the wing tips from poultry carcasses is performed twice in sequential order, wherein the method steps are performed once for separating the right and once for separating the left wing tip.

BRIEF DESCRIPTION OF THE DRAWINGS

Further preferred or suitable features and embodiments of the invention arise from the the description. Particularly preferred embodiments are explained in more detail with reference to the attached drawings. The drawings show:

FIGS. 5 to 11 are diagrammatic views of the apparatus according to the invention as a poultry upper arm passes through.

DETAILED DESCRIPTION OF THE PREFERRED EMBODIMENTS

The apparatus according to the invention and the method according to the invention are described with reference to the above-mentioned figures. To avoid repetition, the statements made in relation to the apparatus also apply to the method according to the invention, so that the statements made below concern only selected aspects of the method according to the invention, separate from the apparatus according to the invention.

Figure 1:
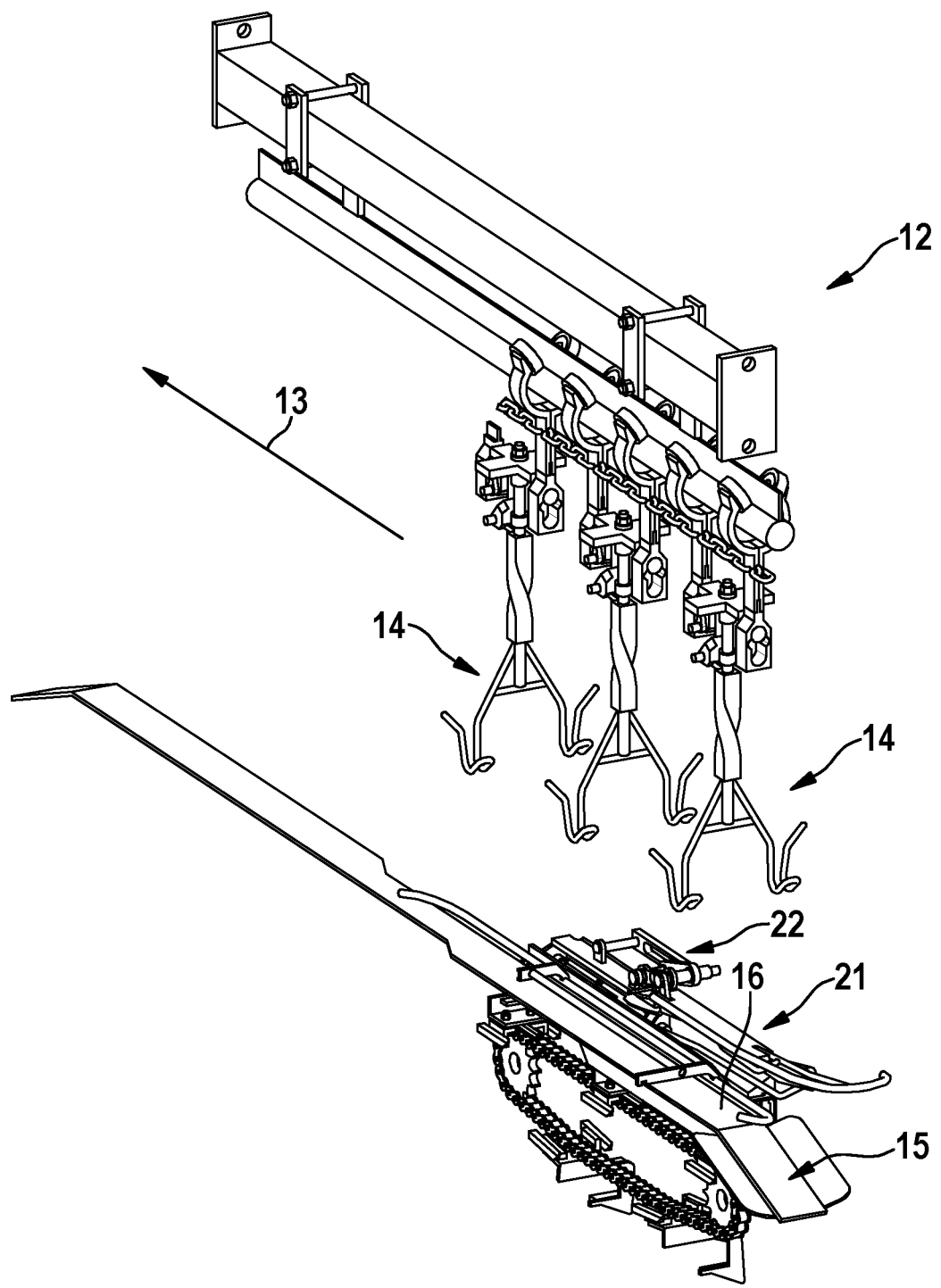
FIG. 1 is a perspective view of the apparatus according to the invention.

FIG. 1 shows a perspective view of the apparatus according to the invention for separation of the wing tips 20 (not shown in FIG. 1) from poultry carcasses 11. The apparatus comprises a suspended conveyor device 12 which is configured to convey poultry carcasses 11 along a conveyor line in the transport direction 13. FIG. 1 shows as an example three shackles 14, by means of which the poultry carcasses 11 are transported suspended upside down, preferably breast facing forward, in the transport direction 13.

The neck and shoulder regions of the poultry carcasses 11 are guided by means of a support guide 15 which is configured for this purpose and arranged below the poultry carcass 11 or shackle 14, and extends in the transport direction 13. The support guide 15 has at least one support surface 16 which is configured to support the neck and shoulder region of the poultry carcass 11.

Figure 4:
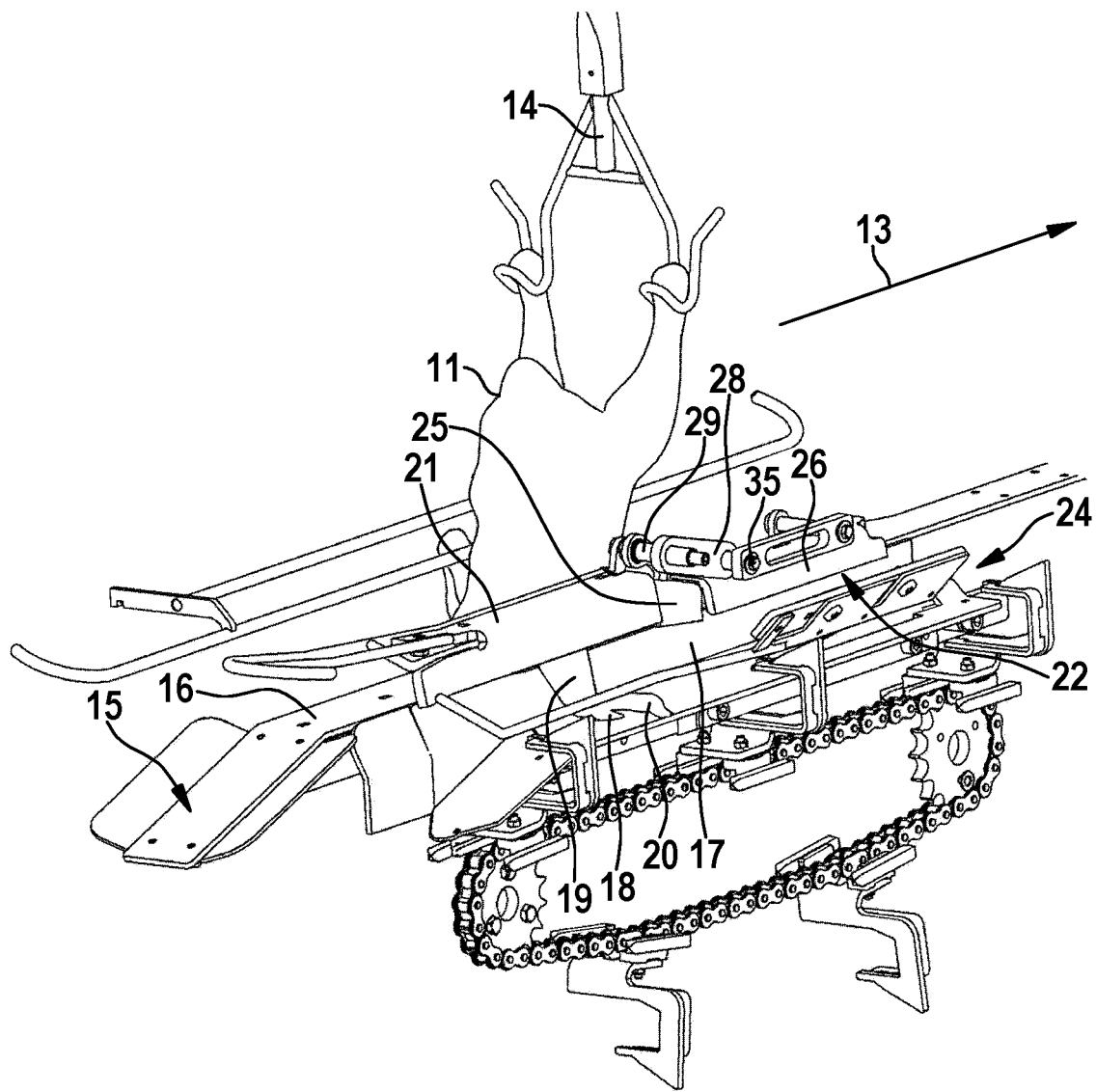
FIG. 4 is a perspective view of the apparatus shown in FIGS. 1 to 3 with a poultry carcass.

FIG. 4 shows, for reasons of greater clarity, as an example only one poultry carcass 11 which is conveyed by means of the suspended conveyor device 12 in the transport direction 13. As FIG. 4 shows, the apparatus according to the invention has a lower arm guide 17 arranged at the side of the support guide 15 and configured to guide poultry lower arms and wing tips 20 of the poultry carcass 11.

The poultry arm itself consists of a poultry upper arm 19, also referred to as the upper wing. The poultry lower arm, also called the mid wing, adjoins the poultry upper arm 19. The wing tip 20 adjoins the poultry lower arm.

For orientation and positioning of the poultry arm, the apparatus according to the invention has a first, stationarily arranged hold-down guide 21 which is configured to hold down the poultry upper arm 19. The first hold-down guide 21 is configured to guide the poultry upper arm 19 under pretension. For this, the first hold-down guide 21 comes into guiding contact with the underside of the poultry upper arm 19 of the poultry carcass 11 which is conveyed suspended upside down.

A second hold-down guide 22 is arranged downstream of the first hold-down guide 21 in the transport direction 13. The second hold-down guide 22 comprises at least two guiding elements 23 configured for holding down the poultry upper arm 19. The guiding elements 23 are each arranged so as to be movable in deflection against a return force. In other words, the guiding elements 23 are not stationary but movable. The guiding elements 23 are thus configured to be able to deflect to a certain extent on passage of one of the poultry upper arms 19. The guiding elements 23 are furthermore configured to return automatically to the starting position and therefore exert a guiding force on the poultry upper arm 19 against the counter force occurring in the poultry arm because of muscular and tendon elongation.

The return force is generated for example by the own weight of the guiding elements 23. Alternatively, the guiding elements 23 are spring-loaded. A combination of own weight and a spring return element may also be used to produce the return force. Optionally, it is possible to arrange additional weight elements (not shown in the drawing) on the guiding elements 23 in order to adapt optimally the own weight of the guiding elements 23 to the desired return force in order to meet the respective requirements.

In the region of the second hold-down guide 22, a separating device 24 is provided which is configured to separate the wing tips 20. The separating device 24 comprises for example two knives which form a V-shaped cutting gap, tapering in the transport direction 13, which receives the region to be separated between the poultry lower arm and the wing tip 20, and finally the wing tip 20 is separated from the poultry lower arm by a separating cut.

Alternatively, further knife arrangements may be used, for example rotating circular knives or similar.

Figure 2:
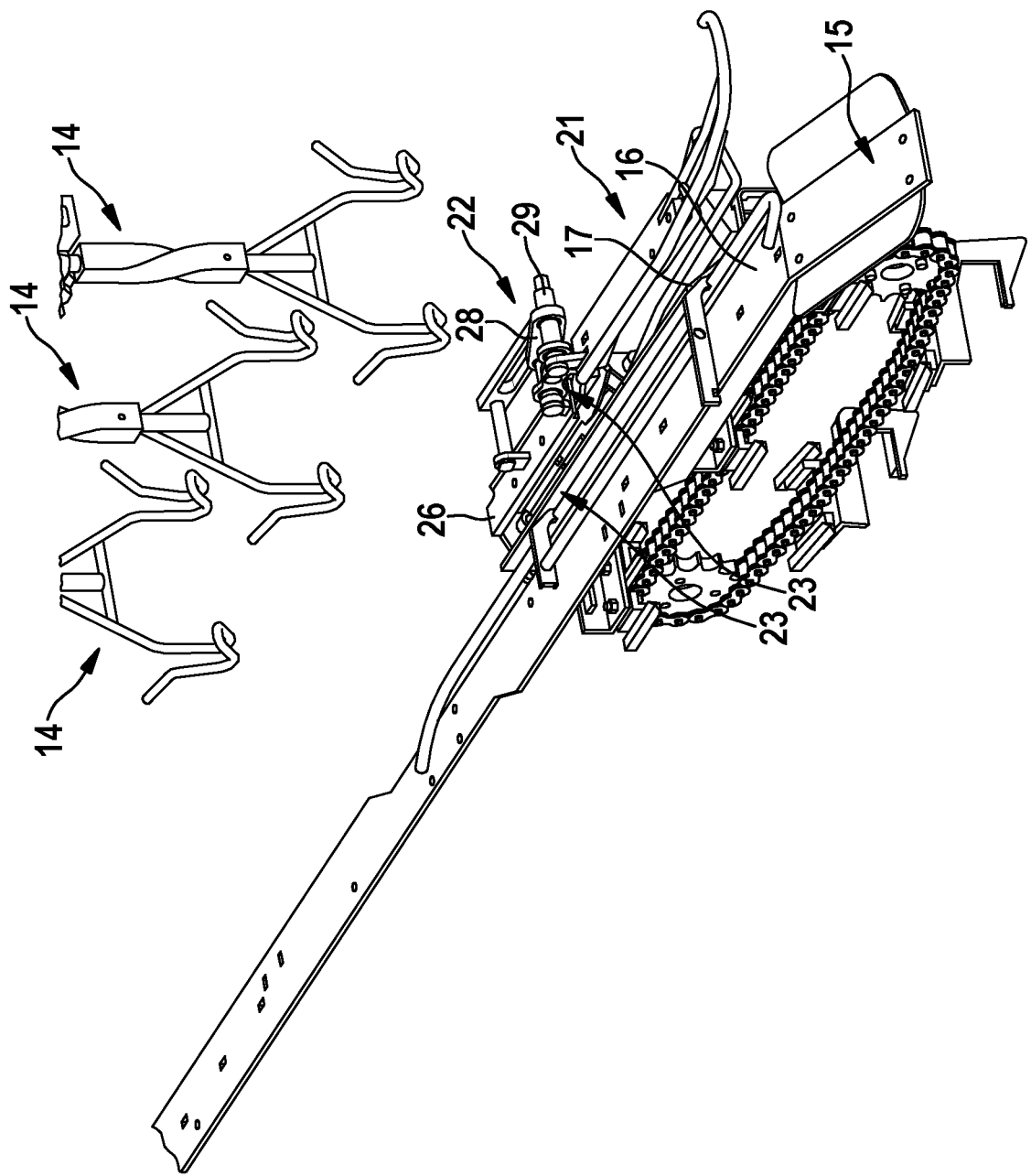
FIG. 2 is a detail view of the apparatus shown in FIG. 1.
Figure 3:
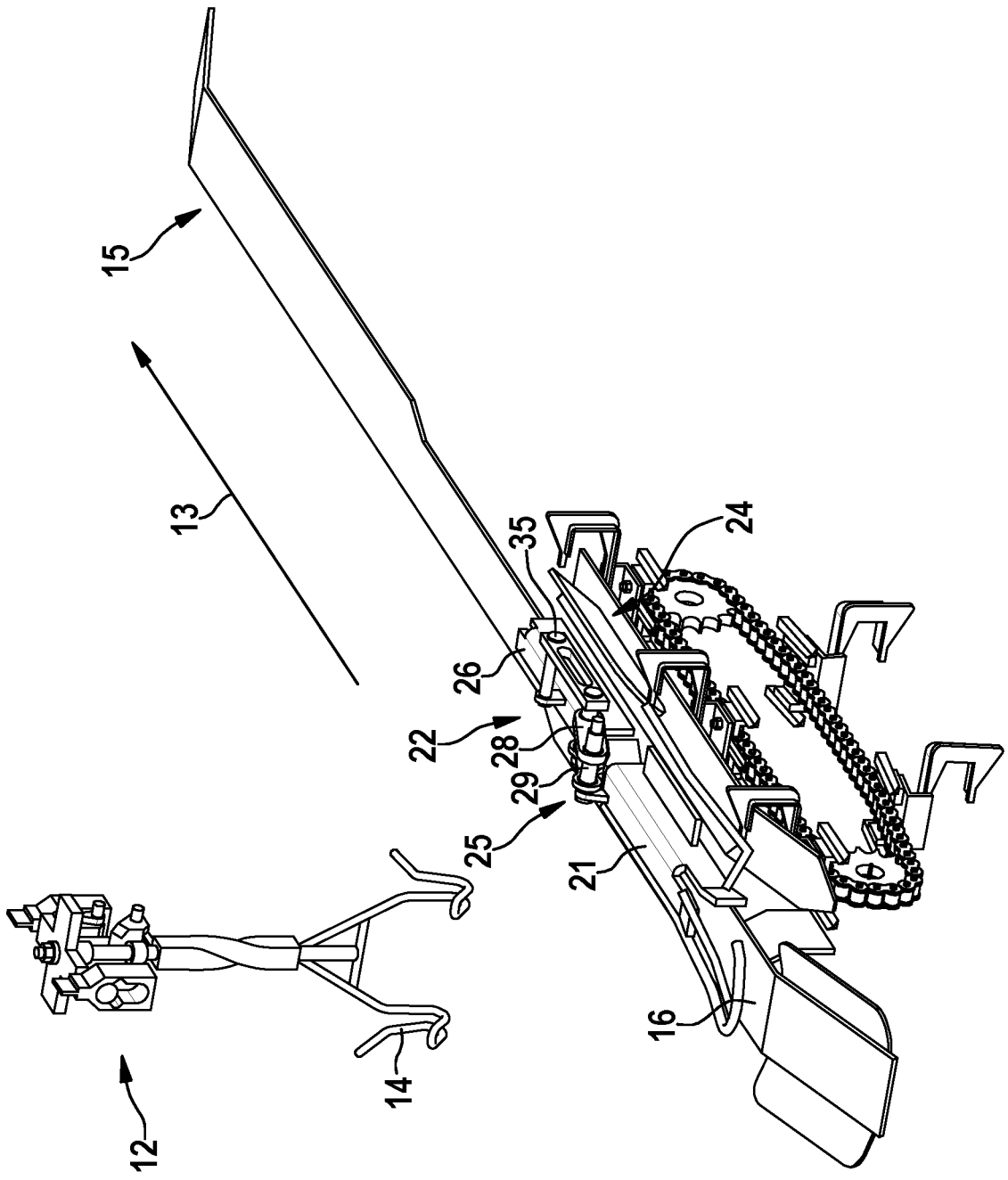
FIG. 3 is the detail view shown in FIG. 1 from a further perspective.

In addition, the apparatus according to the invention is shown in enlarged depiction in FIGS. 2 and 3. The apparatus shown in FIGS. 1 to 4 is designed to separate the wing tips 20 on the right viewed in the transport direction 13, i.e. to cut off the left wing anatomically. This serves merely for greater clarity. The apparatus according to the invention is however in principle configured to cut the wing tips 20 on both the right and left sides. See also FIG. 12, which illustrates the arrangement according to the invention as described later.

Preferably, one of the guiding elements 23 is configured as a pre-guiding element 25 for holding down the poultry upper arm 19 at the inlet to the separating device 24. The inlet to the separating device 24 is a region of the conveyor line before the parts of the poultry arm come into engagement with the separating device 24. The pre-guiding element 25 is thus configured for pre-orientation and pre-positioning of the poultry arm in order to guarantee high reliability and precision for the subsequent separating process.

Furthermore, preferably, one of the guiding elements 23 is configured as a separating guide element 26 for holding down the poultry upper arm 19 in an operating region of the separating device 24 for separating the wing tip 20 from the poultry lower arm. The operating region of the separating device 24 is the portion of the conveyor line which lies in the region of the separating device 24.

Preferably, the first hold-down guide 21, the lower arm guide 17, the pre-guiding element 25 and the separating guide element 26 are each formed with an at least substantially L-shaped profile. Said guides thus each have an upper arm guiding surface 27 which is configured to exert a guiding force on the poultry upper arm 19 in the direction of gravity. Also, said guides each have a lower arm guiding surface 42 for exerting a guiding force on the poultry lower arm perpendicularly to the direction of gravity.

To illustrate the function of the apparatus according to the invention, FIGS. 5 to 11 each show diagrammatic views of the apparatus according to the invention on passage of a poultry upper arm 19 (depicted simplified in cross-section as a circle). For reasons of greater clarity, no further parts of the poultry arm have been depicted in FIGS. 5 to 11.

Advantageously, the pre-guiding element 25 is arranged on a pivot arm. The pivot arm 28 is configured so as to be pivotable about a stationary pivot axis 29. The pivot axis 29 is configured running in a first end region 30 above the first hold-down guide 21.

Figure 5:
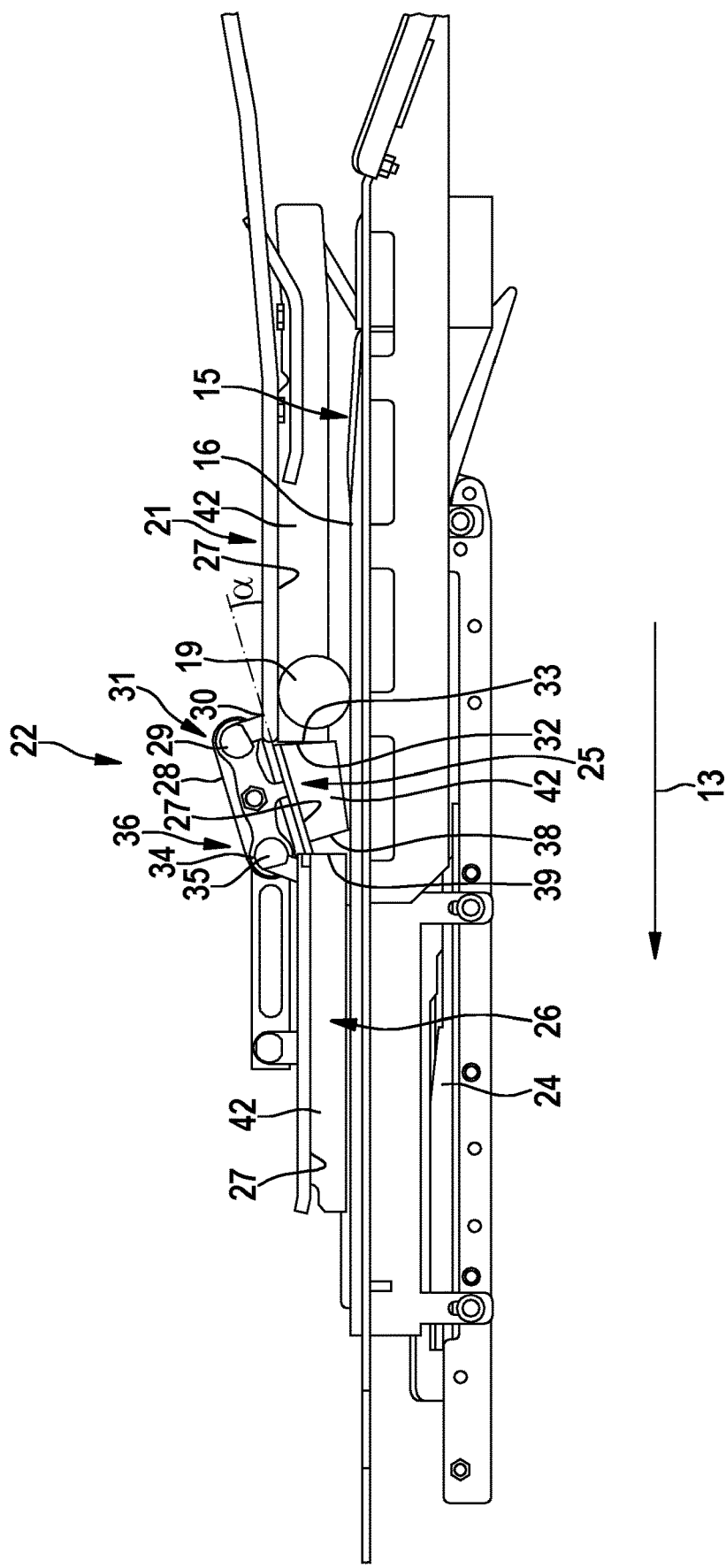

FIG. 5 shows a momentary picture in which the poultry upper arm 19 is still in the region in front of the pre-guiding element 25. The pivot arm 28 with the pre-guiding elements 25 is in a waiting position, and is arranged so as to be pivotable about the stationary pivot axis 29, forming a first pivot joint 31, such that in the waiting position, said axis is oriented tilted towards the support guide 15. The pivot arm 28 and the pre-guiding element 25 are thus pivotable such that, in the waiting position, they have an oblique position tilted by a tilt angle α.

Preferably, the first pivot joint 31 has pivot travel limitations. For this, on the end face pointing towards the first hold-down guide 21, the pre-guiding element 25 has a first counter surface 32. The counter surface 32 is configured to limit the tilt angle α to a maximum tilt in which, in the waiting position, said surface comes into contact with a first end face surface 33 of the first hold-down guide 21 with at least partial positive locking.

Figure 7:
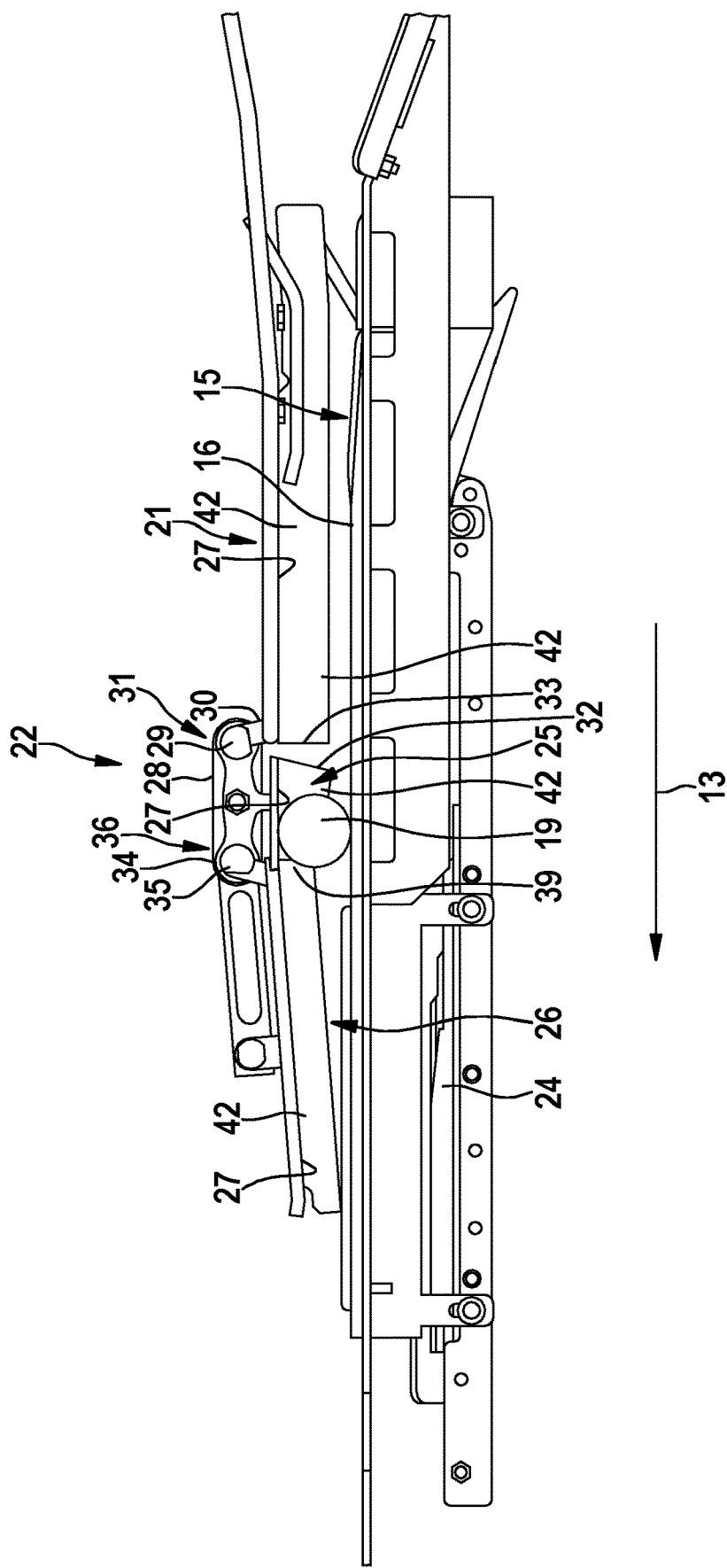
Figure 8:
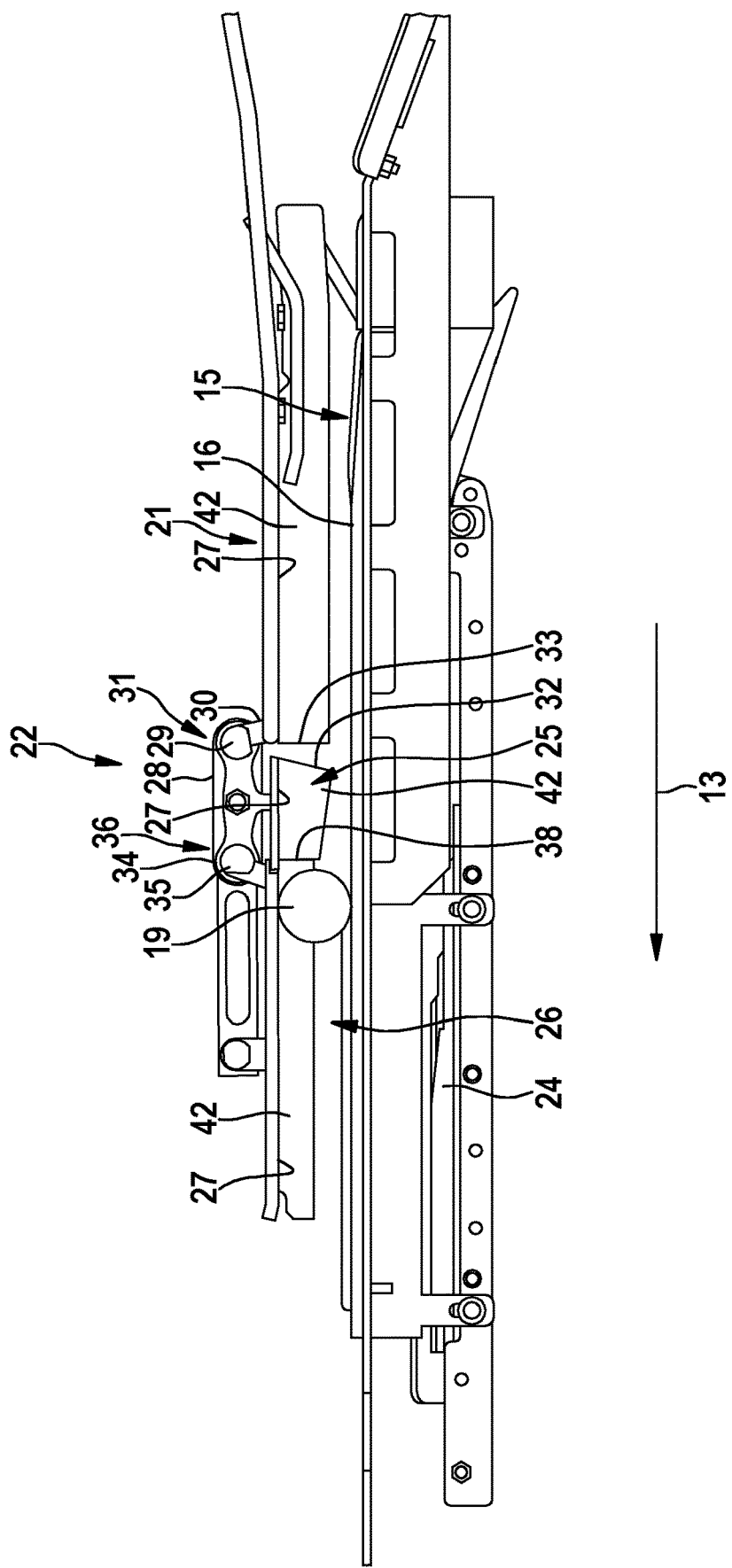
Figure 9:
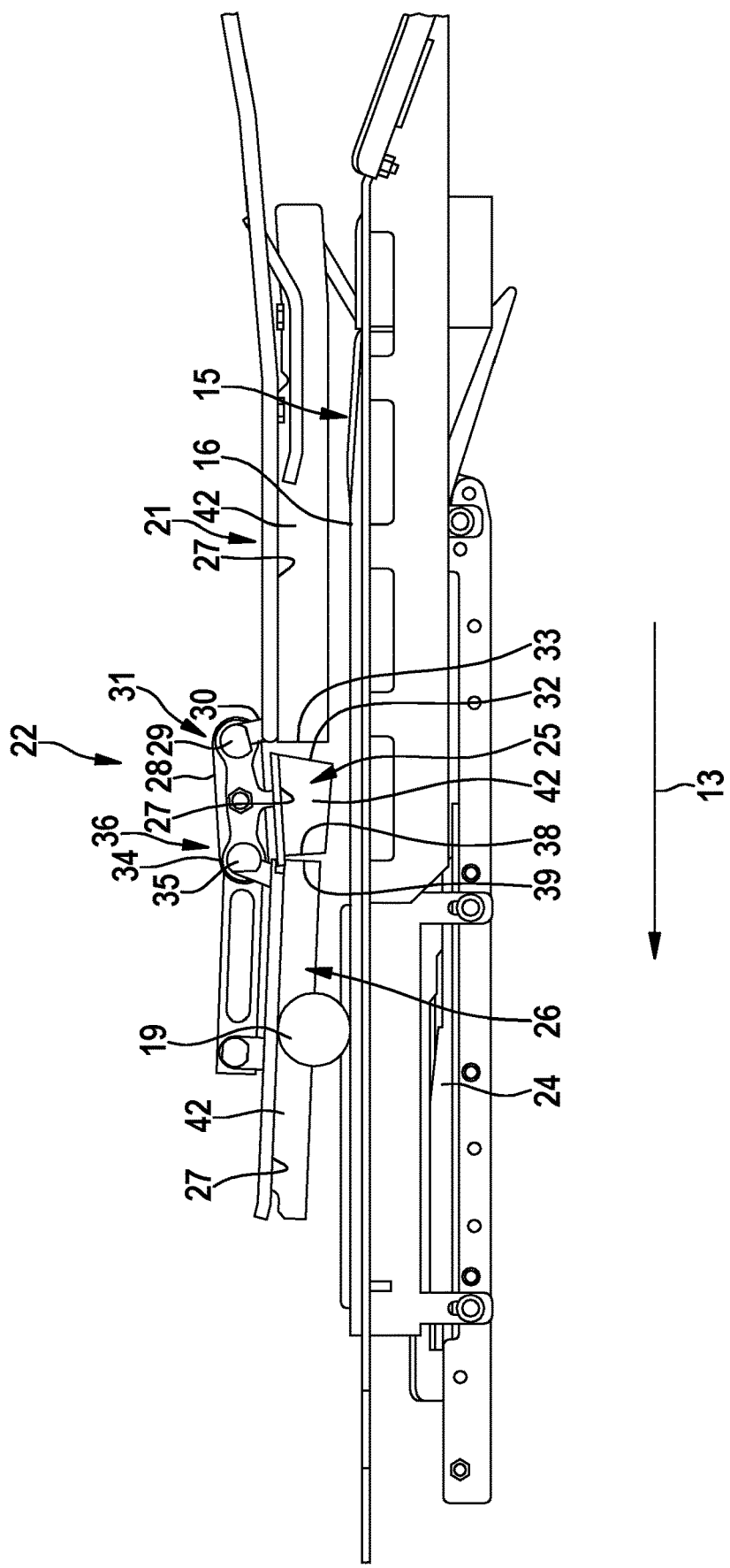
Figure 10:
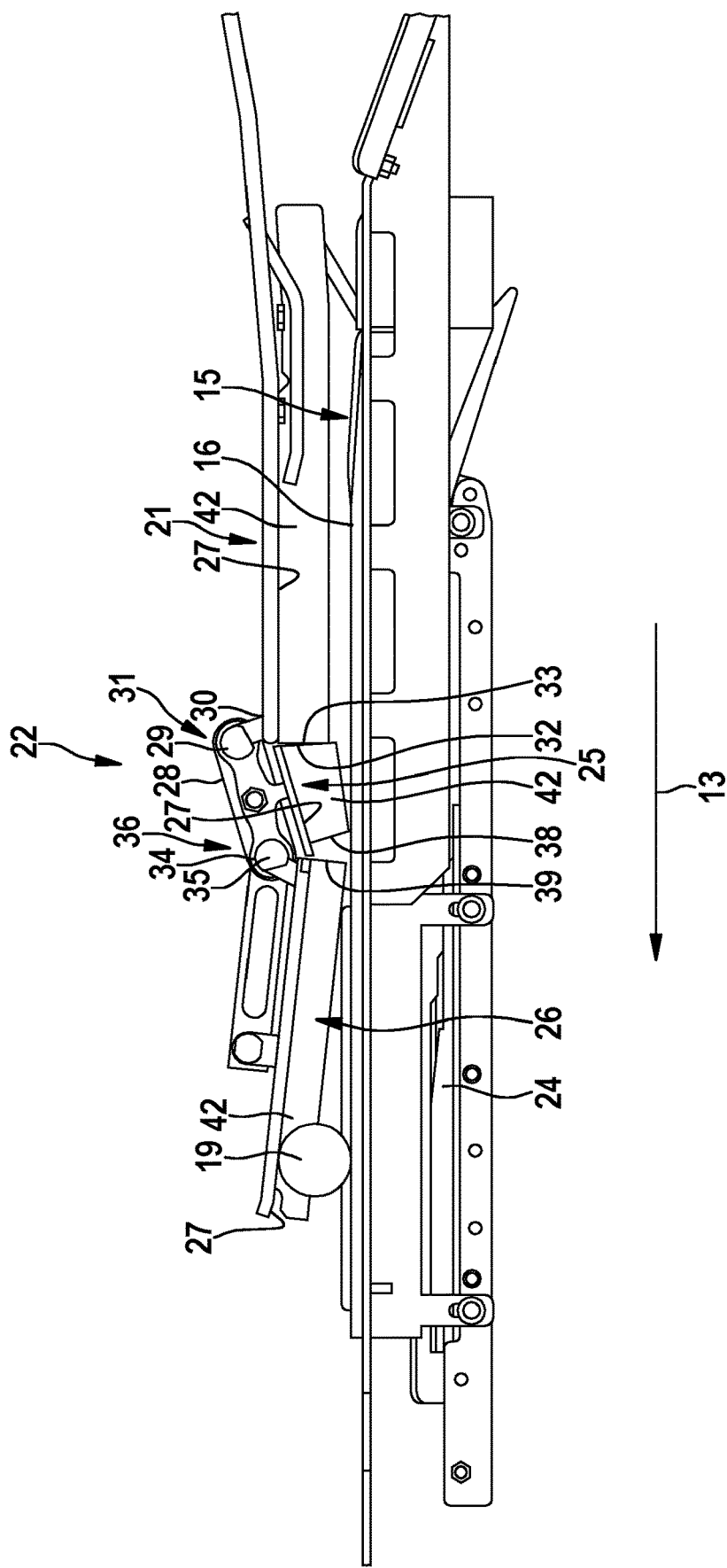
Figure 11:
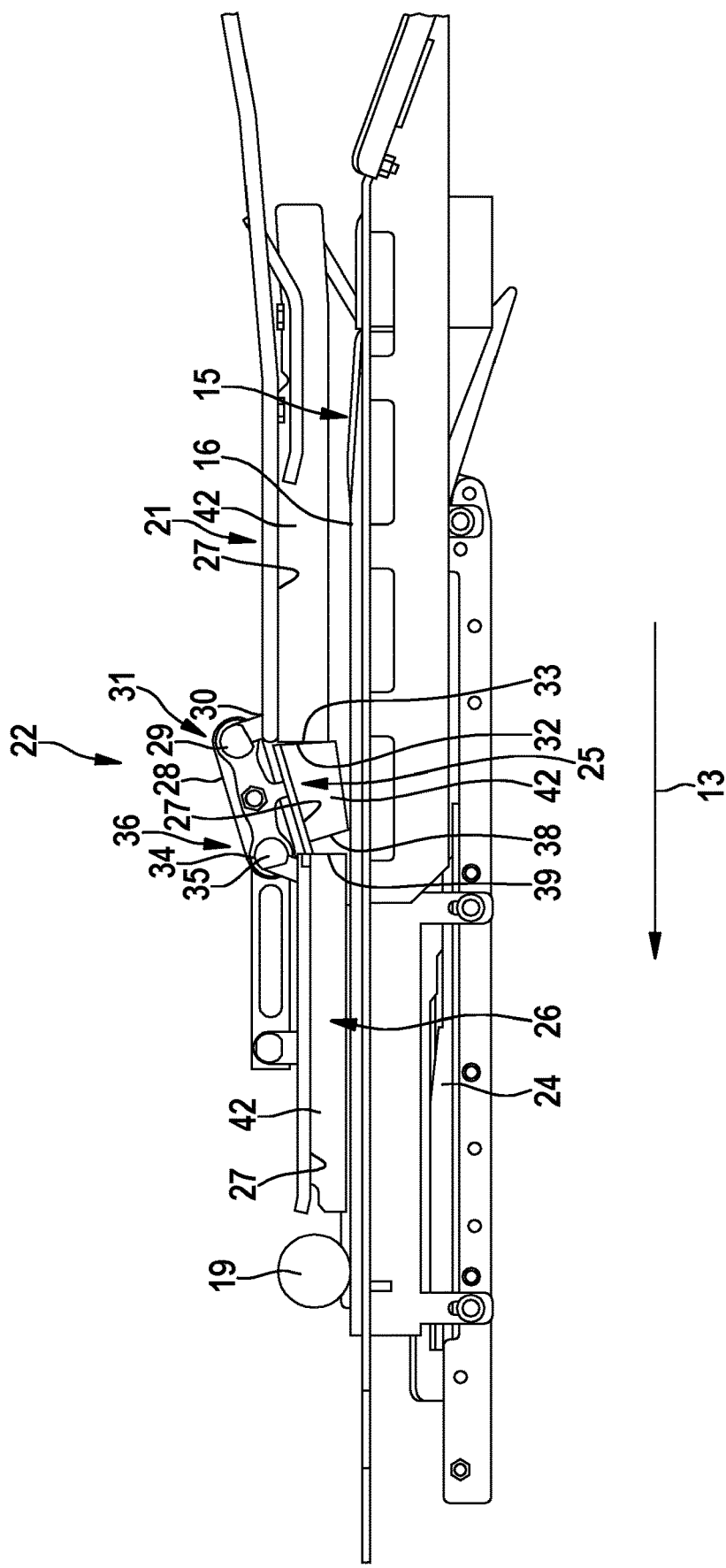

FIG. 7 shows that the counter surface 32 is configured for example as a sloping surface, while the first end face surface 33 is configured as a straight surface. By selecting the tilt angle of the counter surface 32 in relation to the straight first end face surface 33, the maximum tilt angle α can be set and predefined. Preferably, the tilt angle of the counter surface 32 corresponds precisely to the maximum tilt.

Advantageously, on the inlet side, the separating guide element 26 is arranged on a free end 34 of the pivot arm 28 so as to be pivotable about a pivotable pivot axis 35, forming a second pivot joint 36. The pivot axis 35 is therefore not stationary but changes its position on a circle arc depending on the respective position of the pivot arm 28.

Figure 6:
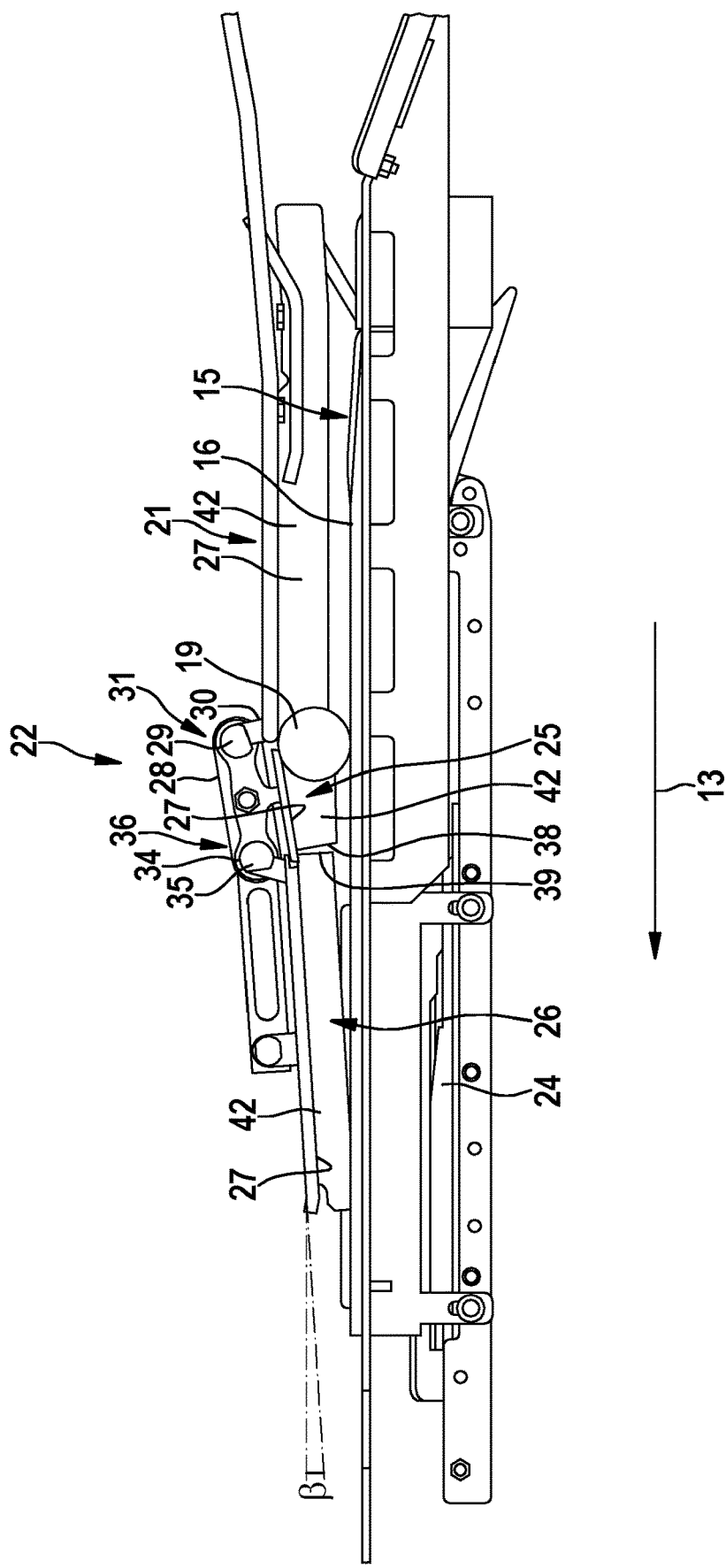

When the poultry upper arm 19 enters the inlet region of the pre-guiding element 25 as shown in FIG. 6, the pivot arm 28 with the pre-guiding element 25 is pivotingly deflected. Thus the pivotable pivot axis 35 describes an upward movement on a circle arc. The separating guide element 26 consequently performs a pivot movement about a point of rotation. This point of rotation is formed by the separating guide element 26 resting on the support surface or resting on the poultry upper arm 19. Consequently, the point of rotation is not stationary but variable in position.

Furthermore, preferably, the separating guide element 26 is arranged on the free end 34 of the pivot arm 28 such that, in the waiting position shown in FIG. 5, the separating guide element 26 is oriented at least substantially parallel to the support surface 16 of the support guide 15, i.e. either parallel or almost parallel.

Advantageously, the pre-guiding element 25 has a second end face surface 38 on the end face pointing towards the separating guide element 26. The second end face surface 38 is configured, on reaching a predefined pivot angle β, to come into contact with an inlet-side second counter surface 39 of the separating guide element 26 with at least partial positive locking, such that the separating guide element 26 together with the pre-guiding element 25 forms a common lever arm which is pivotable about the first pivot joint 31, blocking the second pivot joint 36.

In other words, the pre-guiding element 25 and separating guide element 26 are coupled together such that, on reaching or exceeding said pivot angle β, a forced coupling occurs, blocking the second pivot joint 36. The pre-guiding element 25 and the separating guide element 26 then pivot together about the first stationary pivot axis 29.

The resulting positions of the pre-guiding element 25 and separating guide element 26 on further transport of the poultry carcass in the transport direction 13 are illustrated in FIGS. 8 to 11.

Figure 12:
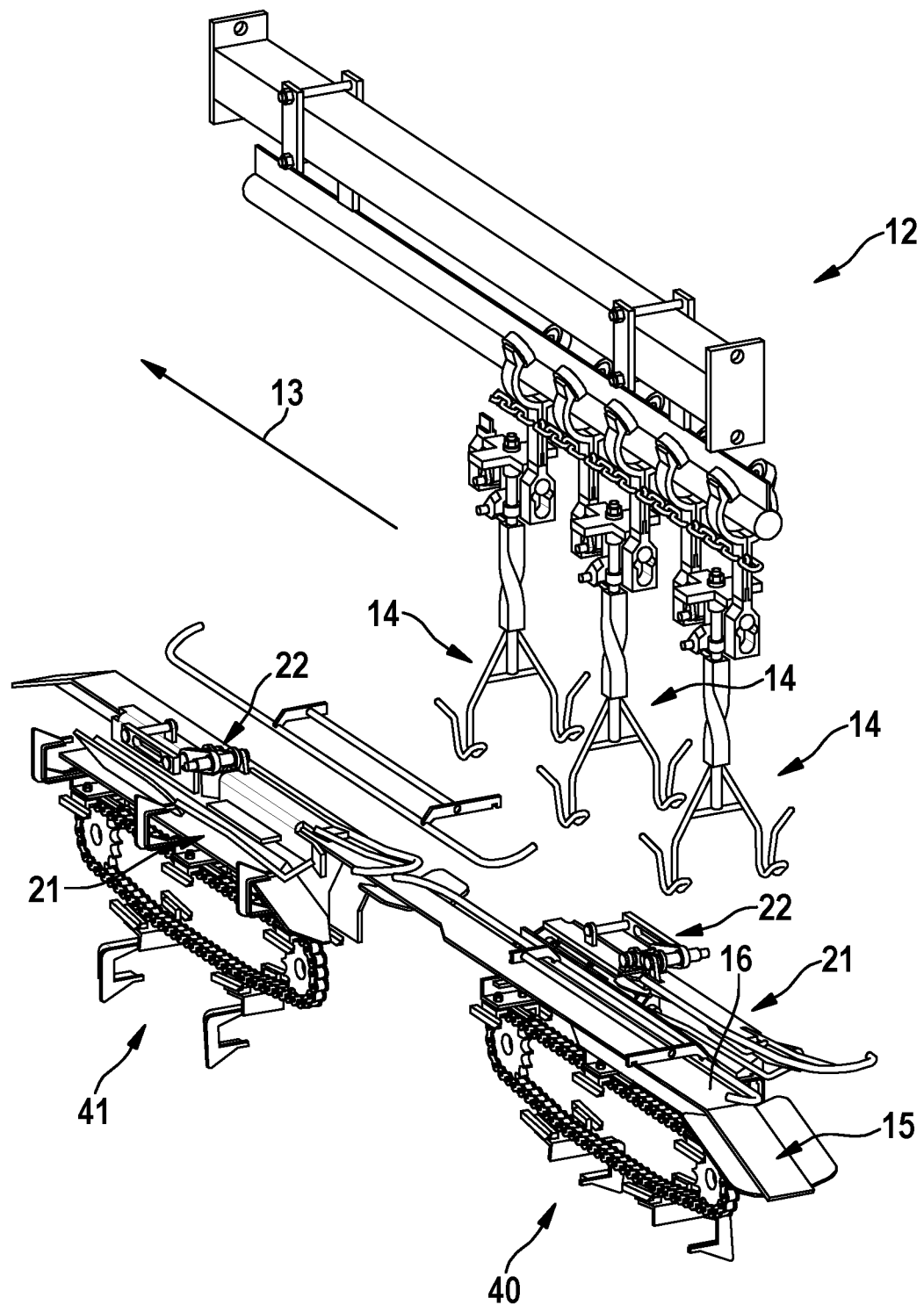
FIG. 12 is a perspective view of the arrangement according to the invention.

The invention is also achieved by the arrangement shown in FIG. 12 for separating the wing tips 20 from the poultry carcasses 11 on both sides. As shown in FIG. 12, the arrangement according to the invention comprises two apparatuses 40, 41 for separating the wing tips 20 from poultry carcasses 11. The apparatuses 40, 41 each comprise the features described above. The two apparatuses 40, 41 are arranged sequentially behind one another, wherein the apparatus 40 is configured to separate the right and the respective other apparatus 41 is configured to separate the left wing tip 20. The order of the sequential arrangement of the two apparatuses 40, 41 is arbitrary so that the wing tips 20 may also be separated in the reverse order.

The invention claimed is:

1. An apparatus for separating wing tips from poultry carcasses, comprising:

a suspended conveyor device configured to convey poultry carcasses suspended from legs along a conveyor line in a transport direction;

a support guide configured for guiding a neck and shoulder region, the support guide extending in the transport direction and arranged below the poultry carcass, the support guide having at least one support surface configured to support the neck and shoulder region of the poultry carcass;

a lower arm guide configured for guiding a poultry lower arm and wing tip of the poultry carcass, the lower arm guide being arranged at a side of the support guide;

a first hold-down guide configured for holding down a poultry upper arm under pretension, the first hold-down guide being arranged stationarily;

a second hold-down guide arranged downstream of the first hold-down guide in the transport direction, the second hold-down guide having at least two guiding elements configured for holding down the poultry upper arm, wherein the guiding elements are arranged so as to be movable in deflection against a return force; and a separating device configured for separating the wing tip, the separating device being arranged along the conveyor line in the region of the second hold-down guide.

2. The apparatus according to claim 1, wherein one of the guiding elements is formed as a pre-guiding element for holding down the poultry upper arm at an inlet to the separating device.

3. The apparatus according to claim 2, wherein another one of the guiding elements is configured as a separating guide element for holding down the poultry upper arm in an operating region of the separating device in order to separate the wing tip from the poultry lower arm.

4. The apparatus according to claim 3, wherein the first hold-down guide, the lower arm guide, the pre-guiding element and the separating guide element each have an at least substantially L-shaped profile with an upper arm guiding surface for exerting a guide force on the poultry upper arm in the direction of gravity, and a lower arm guiding surface for exerting a guide force on the poultry lower arm perpendicularly to the direction of gravity.

5. The apparatus according to claim 2, wherein the pre-guiding element is arranged on a pivot arm, wherein the pivot arm is configured so as to be pivotable about a stationary pivot axis running in a first end region above the first hold-down guide.

6. The apparatus according to claim 5, wherein the pivot arm with the pre-guiding element is arranged so as to be pivotable about the stationary pivot axis, forming a first pivot joint, such that in a waiting position said stationary pivot axis is oriented tilted towards the support guide by a tilt angle $\alpha$.

7. The apparatus according to claim 6, wherein the pre-guiding element has a first counter surface on an end face pointing towards the first hold-down guide to limit a pivot travel of the first pivot joint, the first counter surface being configured to limit the tilt angle $\alpha$ to a maximum tilt, and in the waiting position comes into contact with a first end face surface of the first hold-down guide with at least partial positive locking.

8. The apparatus according to claim 5, wherein on the inlet side, a separating guide element is arranged on a free end of the pivot arm so as to be pivotable about a pivotable pivot axis, forming a second pivot joint.

9. The apparatus according to claim 8, wherein the separating guide element is arranged on the free end of the pivot arm such that in the waiting position, the separating guide element is oriented at least substantially parallel to the support surface of the support guide.

10. The apparatus according to claim 8, wherein on an end face pointing towards a separating guide element, the pre-guiding element has a second end face surface which is configured, on reaching a predefined pivot angle $\beta$, to come into contact with an inlet-side second counter surface of the separating guide element with at least partial positive locking, such that the separating guide element together with the pre-guiding element forms a common lever arm which is pivotable about the first pivot joint, blocking the second pivot joint.

11. An arrangement for separating wing tips from poultry carcasses on both sides, comprising two apparatuses for separating wing tips from poultry carcasses according to claim 1, wherein the apparatuses are arranged sequentially behind one another, and one of the apparatuses is configured to separate a right and the respective other of the apparatuses is configured to separate a left wing tip.

12. A method for separating wing tips from poultry carcasses, comprising the steps:

conveying of poultry carcasses suspended from legs along a conveyor line in the transport direction with a suspended conveyor device;

guiding a neck and shoulder region with a support guide which extends in the transport direction and is arranged below the poultry carcass, and has at least one support surface configured to support the neck and shoulder region of the poultry carcass;

guiding a poultry lower arm and wing tip of the poultry carcass with a lower arm guide which is arranged at a side of the support guide;

holding down a poultry upper arm under pretension with a first hold-down guide which is arranged stationarily;

holding down the poultry upper arm with a second hold-down guide which is arranged downstream of the first hold-down guide in the transport direction and has at least two guiding elements arranged so as to be movable in deflection against a return force; and separating the wing tips with a separating device which is arranged along the conveyor line in the region of the second hold-down guide.

13. The method according to claim 12, further comprising pre-orienting the poultry upper arm at an inlet to the separating device with one of the guiding elements which is configured as a pre-guiding element for holding down the poultry upper arm.

14. The method according to claim 12, further comprising holding down the poultry upper arm in an operating region of the separating device for separating the wing tip from the poultry lower arm with one of the guiding elements which is configured as a separating guide element.

15. The method according to claim 14, further comprising:

exerting of a guide force on the poultry upper arm in the direction of gravity, and a guide force on the poultry lower arm perpendicularly to the direction of gravity; and the lower arm guide, the pre-guiding element and the separating guide element each have an at least substantially L-shaped profile with an upper arm guiding surface oriented at least substantially horizontally and a lower arm guiding surface oriented at least substantially perpendicularly thereto.

16. The method according to claim 15, further comprising holding down the poultry upper arm with the pre-guiding element by pivoting deflection of the pre-guiding element which is arranged on a pivot arm, wherein the pivot arm pivots about a stationary pivot axis running in a first end region above the first hold-down guide.

17. The method according to claim 16, wherein the pivot arm with the pre-guiding element is pivoted about the stationary pivot axis, forming a first pivot joint, such that, in a waiting position, said stationary pivot axis is oriented tilted towards to the support guide by a tilt angle $\alpha$.

18. The method according to claim 17, wherein a pivot travel of the first pivot joint is limited in that on an end face pointing towards the first hold-down guide, the pre-guiding element has a first counter surface which is configured for limiting the tilt angle $\alpha$ to a maximum tilt and, in the waiting position, comes into contact with a first end face surface of the first hold-down guide with the least partial positive locking.

19. The method according to claim 17, further comprising pivoting of the separating guide element about a pivotable pivot axis, forming a second pivot joint, in that on the inlet side, the separating guide element is pivotably arranged at a free end of the pivot arm.

20. The method according to claim 19, wherein in the waiting position, the separating guide element is oriented at least substantially parallel to the support surface of the support guide.

21. The method according to claim 19, further comprising blocking of the second pivot joint on reaching a predefined pivot angle $\beta$, such that the separating guide element together with the pre-guiding element forms a common lever arm which is pivotable about the first pivot joint.

22. A method for separating wing tips from poultry carcasses on both sides by twice performing the method for separating the wing tips from poultry carcasses according to claim 12, wherein the method steps are performed once for separating a right and once for separating a left wing tip.

\* \* \* \* \*